US010448157B2

(12) United States Patent
Bryant et al.

(10) Patent No.: US 10,448,157 B2
(45) Date of Patent: Oct. 15, 2019

(54) MICROPHONE RECEIVER AND MICROPHONE RECEIVER SYSTEM

(71) Applicant: SAMSON TECHNOLOGIES CORP., Hicksville, NY (US)

(72) Inventors: Douglas P. Bryant, Centerport, NY (US); Sean M. Meagher, Levittown, NY (US)

(73) Assignee: SAMSON TECHNOLOGIES CORP., Hicksville, NY (US)

( * ) Notice: Subject to any disclaimer, the term of this patent is extended or adjusted under 35 U.S.C. 154(b) by 0 days.

(21) Appl. No.: 15/864,471

(22) Filed: Jan. 8, 2018

(65) Prior Publication Data
US 2018/0213325 A1 Jul. 26, 2018

Related U.S. Application Data

(60) Provisional application No. 62/448,599, filed on Jan. 20, 2017.

(51) Int. Cl.
*G03B 31/00* (2006.01)
*G03B 17/56* (2006.01)
(Continued)

(52) U.S. Cl.
CPC ............... *H04R 3/12* (2013.01); *G03B 31/00* (2013.01); *H04R 3/00* (2013.01); *H04R 3/005* (2013.01);
(Continued)

(58) Field of Classification Search
CPC .. G03B 31/00; G03B 17/566; H04R 2420/01; H04R 2420/07
See application file for complete search history.

(56) References Cited

U.S. PATENT DOCUMENTS 5,064,109 A 11/1991 Caster
5,068,683 A 11/1991 Miyazaki
(Continued)

FOREIGN PATENT DOCUMENTS

CN 1905630 A 1/2007
CN 205104919 U 3/2016

OTHER PUBLICATIONS

Extended European Search Report dated May 3, 2018 for the Corresponding European Patent Application No. 18152485.1.
(Continued)

*Primary Examiner* — David L Ton
(74) *Attorney, Agent, or Firm* — Katten Muchin Rosenman LLP (57) ABSTRACT

A microphone receiver system is used for recording an acoustical event in an event space. Wireless microphone captures the acoustical event and transmits the acoustical event as a first signal transmission. The microphone receiver receives the first signal transmission and sends the first signal transmission as a received signal from a first output port of the microphone receiver to an input port of the recording device as the received signal as a representation of the acoustical event. A mounting assembly for connecting the microphone receiver to the recording device, the mounting assembly including a pair of opposing upright portions extending from opposing sides of the microphone receiver, the recording device being held between the opposing upright portions.

6 Claims, 5 Drawing Sheets

(51) Int. Cl.
  *H04R 3/12* (2006.01)
  *H04R 3/00* (2006.01)
  H04M 1/04 (2006.01)
  H04M 1/725 (2006.01)
(52) U.S. Cl.
  CPC ............ *G03B 17/566* (2013.01); *H04M 1/04* (2013.01); *H04M 1/72527* (2013.01); *H04R 2420/01* (2013.01); *H04R 2420/07* (2013.01); *H04R 2499/11* (2013.01)

(56) References Cited

U.S. PATENT DOCUMENTS

| | | | |
|---|---|---|---|
| 5,121,147 A * | 6/1992 | Wada | H04N 5/2251 348/375 |
| 5,189,520 A | 2/1993 | Okayasu et al. | |
| D338,999 S | 9/1993 | Desmith | |
| 5,612,756 A | 3/1997 | Kardach | |
| D389,154 S | 1/1998 | Williamson | |
| 6,215,518 B1 | 4/2001 | Watkins | |
| 6,445,408 B1 | 9/2002 | Watkins | |
| 6,601,999 B1 | 8/2003 | McTeer | |
| 7,440,026 B2 | 10/2008 | Sousa | |
| 2007/0070208 A1* | 3/2007 | Yahagi | H04N 9/802 348/207.99 |
| 2007/0242839 A1 | 10/2007 | Kim et al. | |
| 2014/0044277 A1 | 2/2014 | Yahagi | |

OTHER PUBLICATIONS

Chinese Office Action dated May 29, 2019 for the Corresponding Chinese Patent Application No. 201810054302.5.

* cited by examiner

MICROPHONE RECEIVER AND MICROPHONE RECEIVER SYSTEM

BACKGROUND OF THE INVENTION

1. Field of the Invention

The invention relates to a wireless microphone receiver system that includes a receiver and a recording device. The invention also relates to receiver that includes an integrated mounting assembly for mounting the receiver to a variety of recording devices or support structures or both.

2. Discussion of the Related Art

The convergence of social media and quality, but affordable consumer media equipment has caused a burgeoning creator culture intent on producing media. Current technology is typically created using smartphones or relatively inexpensive digital DSLR cameras. These devices have processing power for video recording and editing. They also have at least an analog audio input port or digital input port, typically a USB port, into which a quality microphone is connected via a cable.

However, in certain circumstances, wireless microphones are preferred for inherent reasons of not being tethered. Thus, a microphone may be connected over a very limited range using a Bluetooth wireless connection.

Similarly, there may be a need to use more than one microphone for obvious reasons, e.g., multiple speakers at the same event.

Thus, a need exists for a device and system that permits standard wireless microphones that operate on VHF or UHF to be operably interconnected with a recording device that may be a smartphone or DSLR camera or the like.

SUMMARY OF THE INVENTION

These and other objectives are met by the present invention.

In accordance with one or more embodiments of the present invention, a microphone receiver system for recording an acoustical event includes a first wireless microphone for capturing the acoustical event and transmitting the acoustical event as a first signal transmission; a microphone receiver in VHF and/or UHF for receiving the first signal transmission, the microphone receiver for sending the first signal transmission as a received signal from a first output port of the microphone receiver; a recording device for receiving the received signal from a first input port of the recording device and recording the received signal as a representation of the acoustical event; a mounting assembly for connecting the microphone receiver to the recording device, the mounting assembly comprising a pair of opposing upright portions extending from opposing sides of the microphone receiver, the recording device being held between the opposing upright portions.

Further, each opposing upright portions comprises an inner side retainer having a planar portion, the planar portion being inclined outwardly toward a body of the microphone receiver.

Further, a pair of bracket arms extends from the opposing side of the microphone receiver, each bracket arm comprising one of the upright portions.

Each opposing upright portions comprises an inner side retainer having a planar portion, the planar portion being inclined outwardly toward a body of the microphone receiver.

In accordance with one or more embodiments of the present invention, one bracket arm of the plurality of the bracket arm is movable relative to a respective side of the microphone receiver.

In accordance with one or more embodiments of the present invention, one bracket arm of the plurality of the bracket arm is fixed relative to a respective side of the microphone receiver.

Further, a cable connection is disposed between the first output port and the first input port, wherein the output port and the input port are digital ports and/or where the output port and the input port are analog ports.

Further, a second wireless microphone captures the acoustical event and transmitting the acoustical event as a second signal transmission; wherein the microphone receiver receives the second signal transmission, the microphone receiver for sending the first signal transmission and the second signal transmission as the received signal from the first output port of the microphone receiver.

Further, a mixing switch is user-selectably setting the received signal to either a mixed mono aural format or a split left and right channel output.

BRIEF DESCRIPTION OF THE DRAWINGS

The details of the invention may be appreciated in accordance with one or more embodiments of the present invention illustrated in the following drawings:

FIG. 5a is a front perspective view of a microphone receiver and mounting assembly in position to be mounted on a tripod.

FIG. 5b is a bottom perspective view of the microphone receiver and mounting adapter of FIG. 5a.

FIG. 5c is a bottom perspective view of the microphone receiver and mounting adapter of FIG. 5a and a shoe mount adapter.

FIG. 5d is a perspective view of a tripod connection.

FIG. 5e is a perspective view of a mounting adapter.

DETAILED DESCRIPTION OF THE INVENTION

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention. In the various views of the drawings, like reference characters designate like or similar parts.

Definitions

All technical and scientific terms shall have the same meaning as commonly understood by one of ordinary skill in the art. Nonetheless, the following terms are defined below to aid in the understanding of the disclosure and the definitions apply to all parts of speech of the term regardless whether the term is defined explicitly as such.

"About," "approximately," or "substantially similar" refer to a 10% variation from the nominal value. Even if not explicitly stated, it is to be understood that a variation is always included in a given value, whether or not the variation is specifically referenced.

Herein, an "acoustical event" may in addition to its plain meaning mean one or more natural or artificial sounds, such as one or more notes being played from on a piano or one or more words spoken by an actor. An "acoustical event" may also refer to the silence or absence of sound between other acoustical events, such as the pause between notes or dramatic pause in an actor's line since recording the absence of sound adds to the understanding of the acoustical event. Thus, an acoustical event may be a play, a musical performance, a speech, a debate, or any other suitable event and/or occurrence.

Forms of the verb "to capture" mean to (a) acquire image and/or audio data, such as an acoustical event, of an object through one or more imaging sensor, such as a digital imaging sensor or a microphone, and/or (b) save that data to one or more files having any suitable format to any suitable non-transitory computer-readable memory.

"Computing device," or interchangeably "hardware," is intended in this disclosure for all purposes to be interpreted broadly and is defined for all uses, all devices, and/or all systems and/or systems in this disclosure as a device comprising at least a central processing unit, a communications device for interfacing with a data network, transitory computer-readable memory, and/or a non-transitory computer-readable memory and/or media. The central processing unit carries out the instructions of one or more computer programs stored in the non-transitory computer-readable memory and/or media by performing arithmetical, logical, and input/output operations to accomplish in whole or in part one or more steps of any method described herein. A computing device may have an onboard power source, access power from a draw power using a A computing device is usable by one or more users, other computing devices directly and/or indirectly, actively and/or passively for one or more suitable functions herein. The computing device may be embodied as computer, a laptop, a tablet computer, a smartphone, camera, imaging device, and/or any other suitable device and may also be a networked computing device, a server, or the like. Where beneficial, a computing device preferably includes one or more human input devices such as a computer mouse and/or keyboard and one or more human interaction device such as one or more monitors. A computing device may refer to any input, output, and/or calculating device associated with providing a virtual reality experience to one or more users.

Although one computing device may be shown and/or described, multiple computing devices may be used. Conversely, where multiple computing devices are shown and/or described, a single computing device may be used.

"Computer program," or interchangeably "software," means any set of instructions stored in a non-transitory computer-readable memory or non-transitory computer-readable media for executing one or more suitable functions and/or for executing one or more methods in this disclosure. Even if not explicitly mentioned, in this disclosure, a computing device includes software having any set of instructions stored in non-transitory computer-readable memory or non-transitory computer-readable media for executing one or more suitable functions and/or for executing one or more methods in this disclosure.

"Non-transitory computer-readable memory," or interchangeably "non-transitory computer-readable media," may be a hard drive, solid state drive, compact disk drive, DVD drive, and/or the like for storing the one or more computer programs.

"Microphone" shall mean a transducer used for converting soundwaves to electrical analog signals corresponding to the soundwaves. "Microphone" encompasses all types of transducers.

"Wireless microphone" and/or "wireless microphone receiver" shall mean a microphone that operates by virtue of transmission and/or reception on the UHF, VHF, 2.4 GHz and/or 5.8 GHz bands as well as the microwave band which is typically 1 GHz to 300 GHz.

Microphone Receiver System

Figure 1:
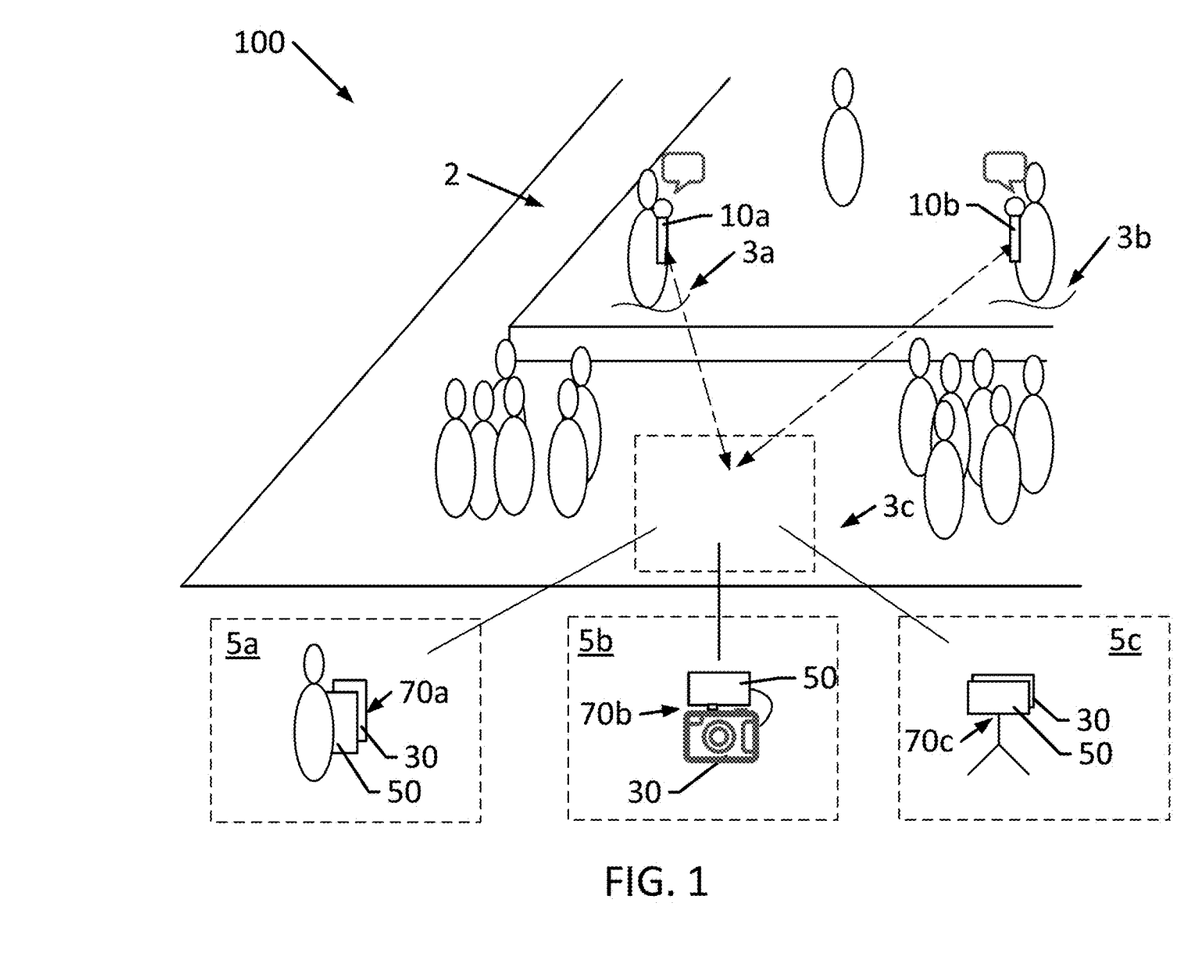
FIG. 1 is a perspective view of a schematic of a microphone receiver system in accordance with one or more embodiments of the present invention.

FIG. 1 is a perspective view of a schematic of a microphone receiver system in accordance with one or more embodiments of the present invention.

In accordance with one or more embodiments of the present invention, a microphone receiver 50 and/or a microphone receiver system 100 are used for making an audio recording on a non-transitory medium of one or more acoustical events occurring in a physical event space.

The microphone receiver system 100 includes at least a first and a second wireless microphone 10a, 10b disposed at locations 3a, 3b, respectively, associated with event space 2, a recording device 30 preferably disposed in any suitable location 3c within or outside of event space 2, and microphone receiver 50 associated with recording device 30 using a mounting assembly 70a, 70b, and/or 70c.

Thus, system 100 comprises two independent sound sources, i.e., wireless microphones 10a, 10b, of an acoustical event that are received by microphone receiver 50 and recorded by recording device 30.

Wireless Microphone

Figures 2A, 2B:
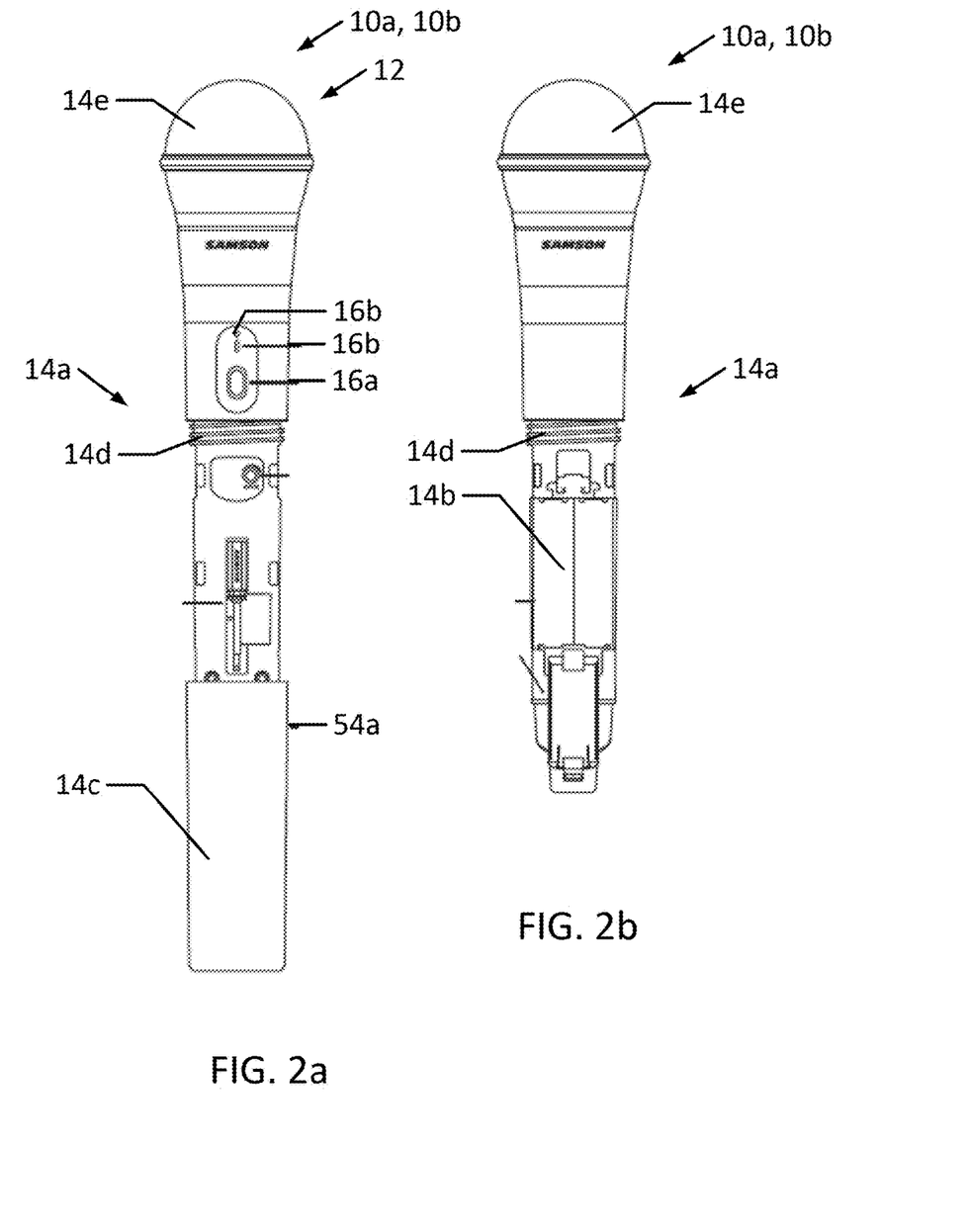
FIG. 2a is a front view of a wireless microphone with a battery cover that has been partially removed in accordance with one or more embodiments of the present invention
FIG. 2b is a rear view of the wireless microphone of FIG. 2a with battery cover fully removed in accordance with one or more embodiments of the present invention.

FIG. 2a is a front view of a wireless microphone with a battery cover that has been partially removed in accordance with one or more embodiments of the present invention FIG. 2b is a rear view of the wireless microphone of FIG. 2a with battery cover fully removed in accordance with one or more embodiments of the present invention.

Each wireless microphone 10a, 10b may be any suitable microphone that each serve as a sound source of the one or more acoustical events occurring in a physical event space. Each wireless microphone 10a, 10b comprises microphone capsule 12 for capturing the one or more acoustical events and a UHF or VHF transmitter for transmitting analog signals of the acoustical event to microphone receiver 50. The analog signals comprise the acoustical event and each wireless microphone 10a, 10b make a transmission 14a, 14b, respectively, of the same acoustical event as a separate source or make a transmission 14a, 14b, respectively, two different acoustical events.

One or both wireless microphones 10a, 10b may also comprises an analog-to-digital converter for converting the analog signals to digital signals. The respective wireless microphone 10a, 10b transmits the digital signals to microphone receiver 50. The digital signals comprise the acoustical event.

The first wireless microphone 10a and second wireless microphone 10b may be part of a plurality of wireless microphones. Thus, it should be understood that one skilled in the art would be able to adapt the present disclosure of a first and a second wireless microphone to a third, fourth and greater number of microphones that are operably part of system 100. It should, however, also be understood that a first and a second wireless microphone provide the advantageous benefit of having a stereophonic capture using two independent sound sources that do not each necessarily are by themselves stereo microphones.

Each wireless microphone 10a, 10b may comprise a microphone body 14a for holding the wireless microphone 10a, 10b by a user, an onboard power source 14b in the form of a battery, a removable battery cover 14c that is preferably secured by a winding 14d, and a transducer cover 14e.

A combined power/pair switch 16a is located on microphone body 14a. When power/pair switch 16a is pressed by a user for less than a predetermined time, for example, 5 seconds, wireless microphone 10a, 10b is turned on or off. When the user presses power/pair switch 16a for more than the predetermined time, wireless microphone 10a, 10b enters a pair mode for pairing wireless microphones 10a, 10b with microphone receiver 50.

Indicator 16b is disposed on microphone body 14b indicates indicating one or more conditions of wireless microphone 10a, 10b. Preferably, indicators 16b comprises a separate indicator light assembly comprising, for example, a light-emitting diode (LED) capable of showing one or more colors for visual reference via a colored light by a user. Indicator 16b indicates whether wireless microphone 10a, 10b is powered by, for example, a green light indicating the presence of power and the absence of a light indicating that microphone 10a, 10b is not powered. Indicator 16b may also be used to indicate the status of the pairing of wireless microphone 10a, 10b with microphone receiver 50 by, for example, intermittently flashing the light of indicator 16b when not paired and maintaining a solid light when the wireless microphone 10a, 10b is paired with microphone receiver 50.

A gain controller 16c is disposed on microphone body 14b for user-selectably adjusting the transmitter input sensitivity of wireless microphone 10a, 10b using any tool including a supplied plastic screwdriver (not shown) to raise or lower the input level. Controller 16c is, preferably, factory preset to provide optimum level for the particular microphone capsule provided with wireless microphone 10a, 10b.

Recording Device

Recording device 30 may be any suitable digital device or analog device capable of recording the acoustical event on a non-transitory computer-readable medium. Recording device 30 further comprises a plurality of ports 34a, 34b for operably connecting microphone receiver 50 to receive one or more signals from microphone receiver 50. Recording device 30 preferably comprises a computing device executing a recording software for saving the acoustical event as an audio recording simultaneous with a video recording such that either one or more audio tracks are part of a video recording file or such that one or more audio recording files is/are separate from the video recording file.

By way of example but not limitation, recording device 30 may be a smartphone (such as an android based phone or iPhone), iPad, iPod Touch, a digital camera, digital single-lens reflex camera (DSLR), or a cinema camera. Where necessary, a digital or analog mixing device or digital or analog mixing software (not shown) is operably disposed between microphone receiver 50 and recording device 30.

Microphone Receiver

Figures 3A, 3B:
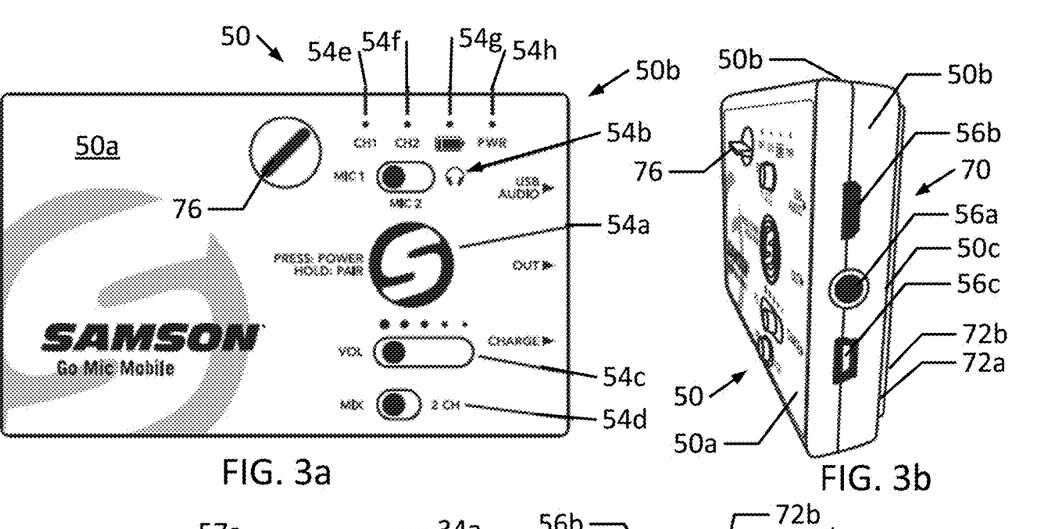
FIG. 3a is a front view of a wireless microphone receiver in accordance with one or more embodiments of the present invention.
FIG. 3b is a side view of the wireless microphone receiver of FIG. 3a in accordance with one or more embodiments of the present invention.

FIG. 3a is a front view of a wireless microphone receiver in accordance with one or more embodiments of the present invention.

FIG. 3b is a side view of the wireless microphone receiver of FIG. 3a in accordance with one or more embodiments of the present invention.

Figure 3C:
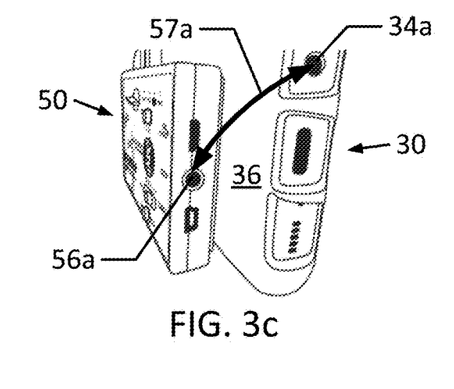
FIG. 3c is a first side view of the wireless microphone receiver of FIGS. 3a and 3b with a recording device in accordance with one or more embodiments of the present invention.

FIG. 3c is a first side view of the wireless microphone receiver of FIGS. 3a and 3b with a recording device in accordance with one or more embodiments of the present invention.

Figure 3D:
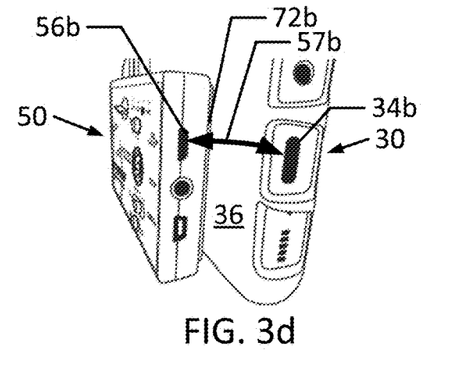
FIG. 3d is a second side view of the wireless microphone receiver of FIGS. 3a and 3b with a recording device in accordance with one or more embodiments of the present invention.

FIG. 3d is a second side view of the wireless microphone receiver of FIGS. 3a and 3b with a recording device in accordance with one or more embodiments of the present invention.

Microphone receiver 50 may be any suitable device for receiving at least first and second transmission 14a, 14b. Therein, microphone receiver 50 comprises a receiver 54 for receiving at least first and second transmission 14a, 14b, a power source (such as an onboard rechargeable battery) or a port for providing power via a power cable, and a digital-to-analog signal processor and/or an analog-to-digital signal processor for converting a signal.

Microphone receiver 50 comprises a body having a front surface 50a, one or more side surfaces 50b, and a rear surface 50c to which a mounting assembly 70 may be secured. A combined power/pair switch 54a is located on front surface 50a. When power/pair switch 54a is pressed by a user for less than a predetermined time, for example, 5 seconds, microphone receiver 50 is turned on or off. When the user presses power/pair switch 54a for more than the predetermined time, i.e., uses a delay, microphone receiver 50 enters a pair mode for pairing microphone receiver 50 with wireless microphones 10a, 10b as described below.

An output selector switch 54b is disposed on front surface 50a and user-selectably switches the wiring of an analog output depending on recording device 30 that is being used. In a first and second setting of switch 54b, i.e., "Mic 1" position or "Mic 2" position, respectively, selects output port 56a is selected for optimally connecting to an input of a recording device 30 that is a smartphone input; in a third setting of switching 54b, i.e., headphone symbol, selects output port 56b is selected for optimally connecting the receiver to a camera, mixer or headphones. Therein, output port 56a provides an analog signal via a cable connection 57a (shown schematically) to an analog input port 34a of recording device 30 and is preferably a 3.5 mm jack; while output port 56b provides a digital signal via a cable connection 57b (shown schematically) to a digital input port 34b of recording device 30 and is preferably a USB compatible port.

A volume control 54c is disposed on front surface 50a and user-selectably adjusts the volume of output ports 56a and/or 56b.

A mixing switching 54*d* is disposed on front surface 50*a* and user-selectably sets the signal delivered recording device 30 via output ports 56*a*, 56*b* to either mixed mono aural format or split left and right channel output. Therein, the MIX/2 CH selection permits the audio will be fed to the camera or recording software input. In the MIX position the two channels are mixed in mono on both the left and right input tracks. In the CH 2 switch position, the CH 1 transmitter is on the left input channel and CH 2 transmitter is on the right input channel. In CH 2 mode, the inputs can be each routed to a different track in a recording software in recording device 30 by creating individual tracks from the left and right input, or by separating the stereo audio from a video recording to edit the channels separately in post-production.

A plurality of indicators 54*e*-54*h* is disposed on front surface 50*a* for indicating one or more conditions of microphone receiver 50. Preferably, each indicator 54*e*-54*h* comprises a separate indicator light assembly comprising, for example, a light-emitting diode (LED) capable of showing one or more colors for visual reference via a colored light by a user. Channel indicator 54*e* and channel indicator 54*f* indicate when the microphone receiver 50 is paired with wireless microphones 10*a*, 10*b*, respectively. Thus, for example, a green light indicates a successful pairing with one of wireless microphones 10*a*, 10*b*, while, a solid or flashing red light indicates an unsuccessful or missing pairing.

Indicator 54*g* indicates the battery level by, for example, a green light indicating when the battery is charged and a red light indicating when the battery is low.

Indicator 54*h* indicates whether microphone receiver 50 is powered by, for example, a green light indicating the presence of power and the absence of a light indicating that/ microphone receiver 50 is not powered.

A power port 56*c* is disposed in side surface 50*b* and permits charging of an onboard battery or direct power connection. Preferably, power port 56*c* is a USB compatible port and, especially, a mini-USB port.

Mounting Assembly

Figures 4A, 4B, 4C, 4D:
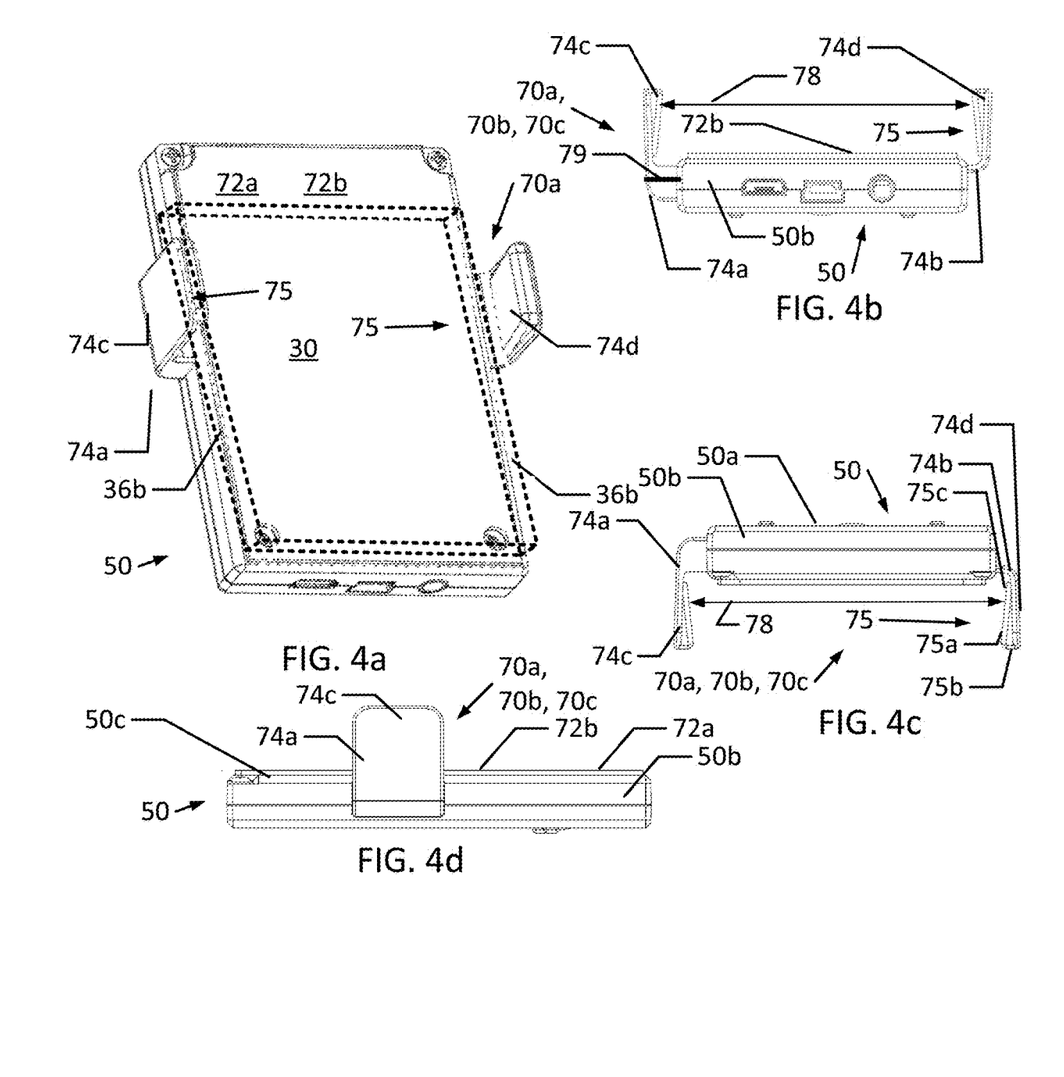
FIG. 4a is an isometric view of the microphone receiver and mounting assembly with a recording device shown in broken lines in accordance with one or more embodiments of the present invention.
FIGS. 4b-4d are side views of the microphone receiver and mounting assembly of FIG. 4a in accordance with one or more embodiments of the present invention.

FIG. 4*a* is an isometric view of the microphone receiver and mounting assembly with a recording device shown in broken lines in accordance with one or more embodiments of the present invention.

FIGS. 4*b*-4*d* are side views of the microphone receiver and mounting assembly of FIG. 4*a* in accordance with one or more embodiments of the present invention.

A mounting assembly 70 is used to mount microphone receiver 50 to one or more support structures, such as a tripod, or a recording device 30.

In accordance with one or more embodiments of the present invention, a user arrangement 5*a* comprises a recording device 30 that preferably has a thin, rectangular form such as a smartphone, microphone receiver 50, and a mounting assembly 70*a* that mounts microphone receiver 50 to directly to a rear surface 36*a* and opposing side edges 36*b* of recording device 30.

Therein, mounting assembly 70*a* is preferably incorporated in the body of microphone receiver 50 by having a cover plate 72*a* secured at least partially to rear side 50*c*. A surface 72*b* of cover plate 72*a* is disposed directly adjacent to rear surface 36 of recording device 30.

Mounting assembly 70*a* includes a pair of mounting bracket arms 74*a*, 74*b* extending away relative to side surfaces 50*b*. Mounting bracket arms 74*a*, 74*b* comprise an upright portion 74*c*, 74*d*, respectively.

An inner side retainer 75 includes a surface 75*a* makes contact with side edges 36*b* of recording device 30. Preferably, surface 75*a* is planar to permit easier mounting to recording device 30. Surface 75*a* is inclined outward from first end 75*b* to second end 75*c*. When two inner side retainers 75 (for example, on bracket arms 74*a*, 74*b*) are used in a pair, a distance 78 between opposing surfaces 75*a* becomes wider closer to the body of microphone receiver 50. As a result, when one or both bracket arms 74*a*, 74*b* are improperly set, recording device 30 is urged closer to the body of microphone receiver 50 to prevent loss of recording device 30.

In accordance with one or more embodiments of the present invention, a pair of inner side retainers 75 is disposed on an inner side of upright portion 74*c*, 74*d*, respectively. First end 75*b* is distal from bracket arm 74*a*, 74*b* and a second end 75*c* is proximal to bracket arms 74*a*, 74*b*. That is, first end 75*b* is disposed at a terminal end of upright portion 74*c*, 74*d*.

A set screw 76 is disposed on front surface 50*a* and provides user-adjustability of distance 78 by moving one or both arms 74, 74*b* relative to each other to retain recording device 30 without play.

That is, by adjusting set screw 76 distance 78 between inner side retainers 75 of upright portions 74*c*, 74*d* of arms 74*a*, 74*b* is varied by a user to retain recording device 30 so that recording device 30 and microphone receiver 50 are securely joined together for their intended use, i.e., be tight with the side edge of the smartphone. Therein, mounting assembly 70*a* may use a rack and pinion mechanism or other assembly as is known in the art to vary distance 78.

In accordance with one or more embodiments of the present invention, mounting assembly 70*a* includes one bracket arm 74*a* that is fixed into microphone receiver 50 through side surface 50*b* using one or more securing devices 79 Securing device 79 may be any suitable device including pins, one or more screws, or a pair of screws. The other bracket arm 74*b* is user adjustable to vary width 78 using set screw 76 to retain recording device 30 without play.

In accordance with one or more embodiments of the present invention, a user arrangement 5*b* comprises a recording device 30 that preferably includes a shoe mount received as are generally known in DSLR, cinema cameras, or smartphone frames and a mounting assembly 70*b* that mounts microphone receiver 50 into the shoe mount receiver. Therein, mounting assembly 70*b* mounts microphone receiver 50 to a DSLR, cinema camera, or smartphone frame using a mounting adapter 80 that slides into a receiver in the DSLR, cinema camera, or smartphone frame.

Mounting assembly 70*b* replaces bracket arm 74*a* with mounting adapter 80 that is secured into microphone receiver 50 using one or more securing devices 79. Adapter 80 comprises a screw hole into which any suitable connector screw 81 may be secured. Mounting assembly 70*b* includes a shoe 82 as is known in the art for being received in a shoe mount receiver and a thumb screw 84 is tightened on shoe 82 to hold the shoe in place in adapter 80. Shoe 84 is slid into the shoe mount receiver in recording device 30.

Figures 5A, 5B, 5C, 5D, 5E:
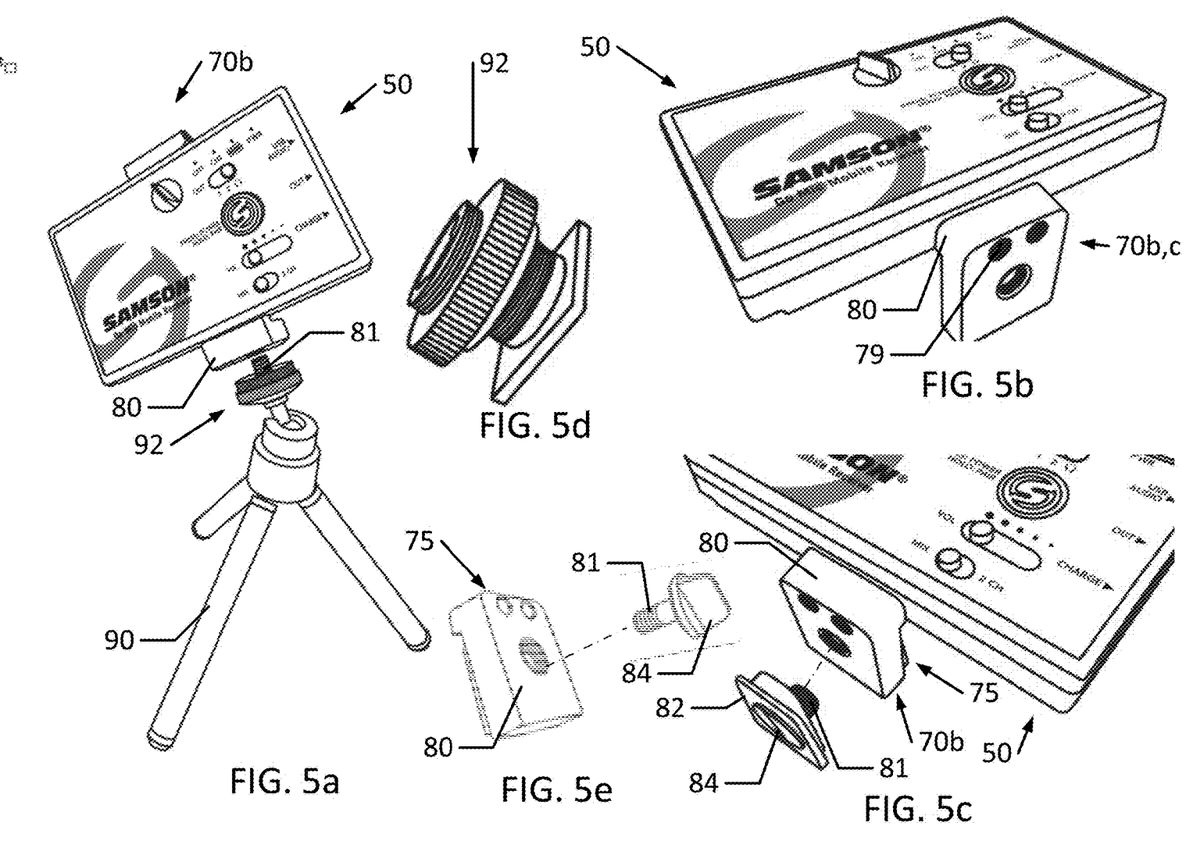

FIG. 5*a* is a front perspective view of a microphone receiver and mounting assembly in position to be mounted on a tripod.

FIG. 5*b* is a bottom perspective view of the microphone receiver and mounting adapter of FIG. 5*a*.

FIG. 5*c* is a bottom perspective view of the microphone receiver and mounting adapter of FIG. 5*a* and a shoe mount adapter.

FIG. 5*d* is a perspective view of a tripod connection.

FIG. 5*e* is a perspective view of a mounting adapter.

In accordance with one or more embodiments of the present invention, a user arrangement 5c comprises recording device 30, microphone receiver 50, mounting assembly 70c, and a support assembly such a tripod 90 having a single or multi-axially displaceable tripod connection 92. Tripod connection 92 comprises a screw 81 as a connector to microphone receiver 50.

Mounting assembly 70c replaces bracket arm 74a with mounting adapter 80 that is secured into microphone receiver 50 using one or more securing devices 79. Adapter 80 comprises a screw hole into which any suitable connector screw 81 may be secured. Adapter comprises an inner side retainer 75 and works in conjunction with a second inner side retainer 75 of bracket arm 74b as taught with respect to mounting assembly.

Usage

In accordance with one or more embodiments of the present invention, when recording device 30 is an iPhone, iPad or iPod Touch, a user connects digital output port 56b on the microphone receiver 50 to digital input port 34 of recording device 30 using cable connection 57b. Therein, microphone receiver 50 and recording device 30 will automatically recognize each other.

In accordance with one or more embodiments of the present invention, when recording device 30 is an android smartphone, a user connects digital output port 56b on the microphone receiver 50 to digital input port 34b of recording device 30 using cable connection 57b. Therein, microphone receiver 50 and recording device 30 will automatically recognize each other.

In accordance with one or more embodiments of the present invention, when recording device 30 is an android smartphone, a DSLR camera, cinema camera, or mixer, a user connects analog output port 56a on the microphone receiver 50 to analog input port 34a of recording device 30 using cable connection 57a. Therein, an adjustment in settings of using switch 54b can be used to facilitate a connection.

Preferably, the analog input and output ports are 3.5 mm jack ports. Output port 56a may also be used for connecting a headphone to be used by the user or for a line out analog connection to a mixer input. Moreover, the low latency of 10 ms or less, of system 100 or, in accordance with one or more embodiments of the present invention solely of microphone receiver 50, eliminates the need for time code correction when putting a video shot, for example, by recording device 30, in sync with the audio. The latency of 10 ms is not detectable by a user during the recording (time correction) or when played back by the user.

In use, microphone receiver system 100 is used for recording an acoustical event in an event space 2. Wireless microphone 10a captures the acoustical event and transmits the acoustical event as a first signal transmission. Microphone receiver 50 receives the first signal transmission and sends the first signal transmission as a received signal from a first output port 56a, 56b of the microphone receiver to an input port 36a, 36b of recording device 30 as the received signal as a representation of the acoustical event. A mounting assembly for connecting the microphone receiver to the recording device, the mounting assembly comprising a pair of opposing upright portions extending from opposing sides of the microphone receiver, the recording device being held between the opposing upright portions.

While the invention has been described in conjunction with specific embodiments, it is to be understood that many alternatives, modifications, and variations will be apparent to those skilled in the art in light of the foregoing description.

What is claimed is:

1. A microphone receiver system for recording an acoustical event, the microphone receiver system comprising:
   a first wireless microphone for capturing the acoustical event and transmitting the acoustical event as a first signal transmission;
   a microphone receiver for receiving the first signal transmission, the microphone receiver for sending the first signal transmission as a received signal from a first output port of the microphone receiver;
   the microphone receiver having a front surface, one or more side surfaces, and a rear surface to which a mounting assembly is secured; and
   a recording device for receiving the received signal from a first input port of the recording device and recording the received signal as a representation of the acoustical event;
   wherein thee mounting assembly for connecting the microphone receiver to the recording device, the mounting assembly comprising a pair of bracket arms extending away relative to opposite side surfaces of the microphone receiver, each bracket arm comprising one upright portion extending from the rear surface of the microphone receiver, the recording device being held between the opposing upright portions,
   wherein each opposing upright portions comprise an inner side retainer having a planar portion, the planar portion being inclined outwardly toward a body of the microphone receiver,
   wherein at least one bracket arm of the pair of bracket arms is movable relative to a respective side of the microphone receiver by adjusting a set screw disposed on the front surface of the microphone receiver, and
   wherein one of the bracket arms is a mounting adapter which comprises a screw whole for connecting to a tripod.

2. The microphone receiver system of claim 1, wherein one bracket arm of the pair of bracket arms is fixed relative to a respective side of the microphone receiver.

3. The microphone receiver system of claim 1, further comprising a cable connection between the first output port and the first input port, wherein the output port and the input port are digital ports.

4. The microphone receiver system of claim 1, further comprising a cable connection between the first output port and the first input port, wherein the output port and the input port are analog ports.

5. The microphone receiver system of claim 1,
   further comprising a second wireless microphone for capturing the acoustical event and transmitting the acoustical event as a second signal transmission;
   wherein the microphone receiver for receiving the second signal transmission, the microphone receiver for sending the first signal transmission and the second signal transmission as the received signal from the first output port of the microphone receiver.

6. The microphone receiver system of claim 1 further comprising a mixing switch for user-selectably setting the received signal to either a mixed mono aural format or a split left and right channel output.

* * * * *